United States Patent
Cunningham et al.

(10) Patent No.: US 10,322,725 B2
(45) Date of Patent: Jun. 18, 2019

(54) POWERTRAIN LASH MANAGEMENT

(71) Applicant: Ford Global Technologies, LLC, Dearborn, MI (US)

(72) Inventors: Ralph Wayne Cunningham, Milan, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 356 days.

(21) Appl. No.: 15/210,631

(22) Filed: Jul. 14, 2016

(65) Prior Publication Data

US 2018/0015926 A1  Jan. 18, 2018

(51) Int. Cl.
  *B60W 10/06* (2006.01)
  *B60W 30/18* (2012.01)
  (Continued)

(52) U.S. Cl.
  CPC .... *B60W 30/18136* (2013.01); *B60W 10/026* (2013.01); *B60W 10/06* (2013.01); *B60W 10/11* (2013.01); *B60W 50/10* (2013.01); *B60W 2030/18081* (2013.01); *B60W 2420/42* (2013.01); *B60W 2510/0233* (2013.01); *B60W 2510/0241* (2013.01); *B60W 2540/10* (2013.01); *B60W 2540/106* (2013.01); *B60W 2540/30* (2013.01); *B60W 2550/308* (2013.01); *B60W 2710/024* (2013.01); *B60W 2710/0666* (2013.01)

(58) Field of Classification Search
  CPC ............ B60W 10/06; B60W 2540/10; B60W 2550/306; B60W 2710/0666; B60W 30/18136
  See application file for complete search history.

(56) References Cited

U.S. PATENT DOCUMENTS

| 5,002,170 A | 3/1991 | Parsons et al. |
| 5,035,308 A | 7/1991 | Baba et al. |
(Continued)

FOREIGN PATENT DOCUMENTS

| CN | 102269656 B | * | 8/2013 | .......... G01M 17/007 |
| EP | 1160119 A1 | | 12/2001 | |
(Continued)

OTHER PUBLICATIONS

Cunningham, Ralph Wayne, et al., "System and Method for Controlling a Torque Converter Clutch," U.S. Appl. No. 15/195,652, filed Jun. 28, 2016, 33 pages.
(Continued)

*Primary Examiner* — Tisha D Lewis
(74) *Attorney, Agent, or Firm* — Julia Voutyras; McCoy Russell LLP

(57) ABSTRACT

Methods and systems are provided for adjusting powertrain torque in a vehicle based on driver intent. Driver intent is inferred based on foot motion inside a foot well monitored via a foot well region sensor and changes in clearance outside the vehicle monitored via a range sensor. By adjusting powertrain torque based on operator foot motion and traffic movements outside the vehicle, frequency of lash transitions can be reduced and lash transition initiation can be adjusted based on expected changes in torque demand.

18 Claims, 5 Drawing Sheets

(51) Int. Cl.
*B60W 10/11* (2012.01)
*B60W 50/10* (2012.01)
*B60W 10/02* (2006.01)

(56) References Cited

U.S. PATENT DOCUMENTS

| | | | |
|---|---|---|---|
| 5,133,232 | A | 7/1992 | Kikuchi et al. |
| 5,211,270 | A | 5/1993 | Tamura et al. |
| 5,314,050 | A | 5/1994 | Slicker et al. |
| 5,594,416 | A * | 1/1997 | Gerhaher ............... B60Q 1/302 |
| | | | 307/10.8 |
| 5,795,262 | A | 8/1998 | Robinson |
| 6,024,673 | A * | 2/2000 | Hayashi ................ F16D 48/066 |
| | | | 192/13 R |
| 6,042,507 | A | 3/2000 | Genise et al. |
| 6,833,791 | B2 | 12/2004 | Bullinger et al. |
| 6,908,412 | B2 | 6/2005 | Kurabayashi |
| 7,171,299 | B1 | 1/2007 | Stroh |
| 7,266,453 | B2 | 9/2007 | Sawamoto et al. |
| 7,769,517 | B2 | 8/2010 | Segawa et al. |
| 8,131,430 | B2 | 3/2012 | Lecointre et al. |
| 8,374,759 | B2 | 2/2013 | Arlauskas et al. |
| 8,401,768 | B2 | 3/2013 | Lewis et al. |
| 8,954,215 | B2 | 2/2015 | Yamazaki et al. |
| 2002/0190854 | A1* | 12/2002 | Swan ..................... B60Q 1/444 |
| | | | 340/467 |
| 2006/0111220 | A1 | 5/2006 | Ogawa et al. |
| 2008/0172161 | A1 | 7/2008 | Kondo et al. |
| 2009/0192683 | A1* | 7/2009 | Kondou ................ B60W 10/18 |
| | | | 701/53 |
| 2011/0039657 | A1 | 2/2011 | Gibson et al. |
| 2013/0296100 | A1 | 11/2013 | Nefcy et al. |
| 2014/0067225 | A1 | 3/2014 | Lee et al. |

FOREIGN PATENT DOCUMENTS

| | | |
|---|---|---|
| EP | 2055558 A2 | 5/2009 |
| EP | 2055569 A2 | 5/2009 |

OTHER PUBLICATIONS

Cunningham, Ralph Wayne, et al., "Methods and System for Decelerating a Vehicle," U.S. Appl. No. 15/170,014, filed Jun. 1, 2016, 39 pages.

* cited by examiner

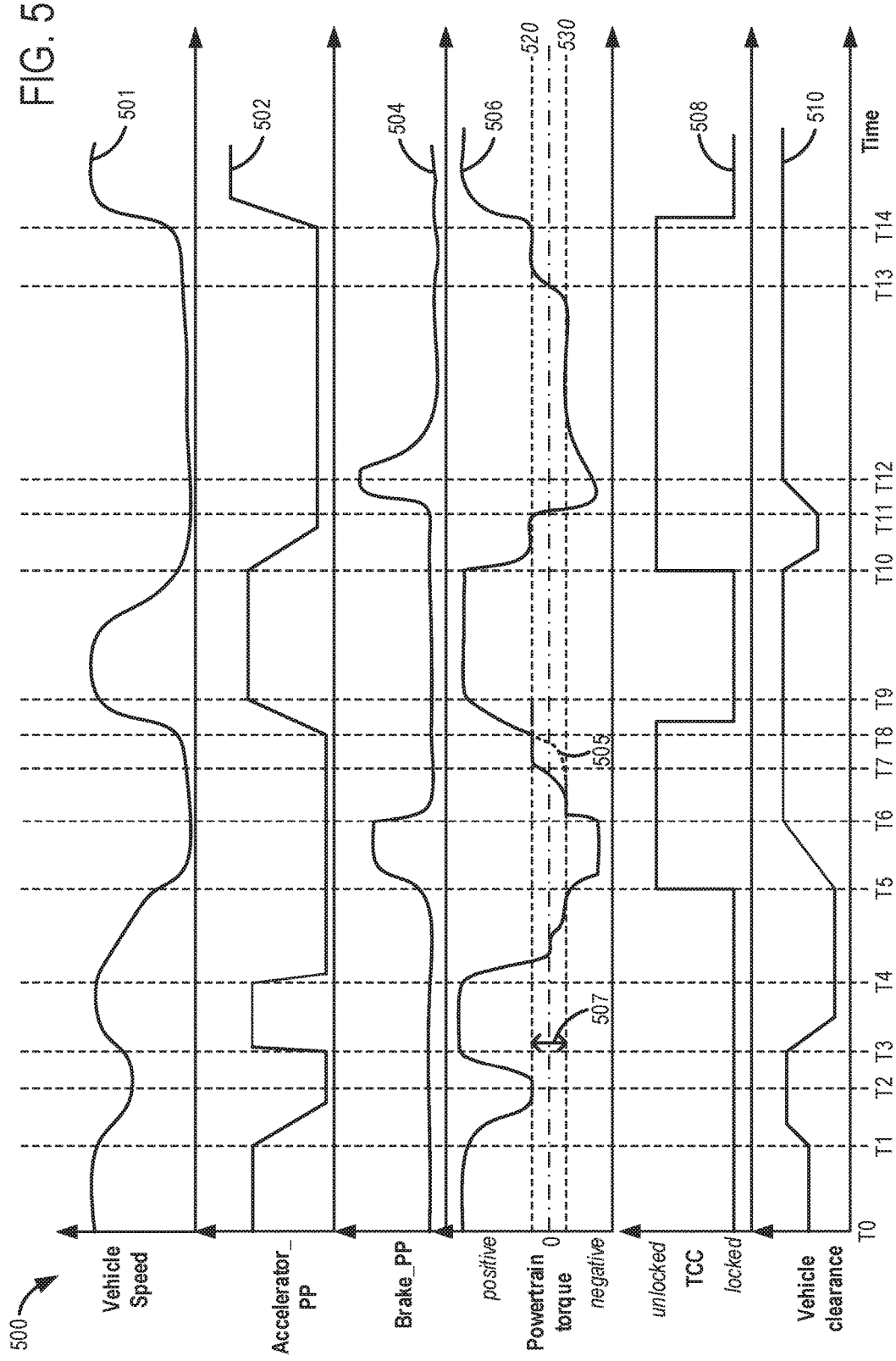

POWERTRAIN LASH MANAGEMENT

FIELD

The present description relates generally to methods and systems for controlling a vehicle engine to manage lash in a vehicle driveline.

BACKGROUND/SUMMARY

Lash in a vehicle may occur due to lost motion caused by slack or clearance within components of a vehicle driveline. Driveline torque transitions through zero torque during powertrain braking or propulsion may create clunk or backlash in the driveline causing driver discomfort. By gently taking up lash before substantial torque is applied, effects of crossing the lash zone may be mitigated to reduce driver discomfort and improve vehicle drivability. Several approaches of managing lash in a vehicle transmission system have been studied.

On example approach of managing driveline lash is provided by Yamazaki et al. in U.S. Pat. No. 8,954,215. Therein, a controller controls torque from a traction motor coupled to an engine and driveline input torque to vehicle wheels during torque reversal from positive to negative torque in order to limit the rate of change of traction and driveline torque. In another example, shown by Stroh in U.S. Pat. No. 7,171,299, a rate of torque change in a vehicle driveline may be reduced to threshold levels by a system with a torque based module, a filter and an engine control module. The torque based module generates a torque request based on operator input. The filter, whose parameters are determined based on engine operating conditions, modifies the torque request by reducing torque changes to a predetermined torque range. The engine control module receives the modified torque request and controls engine throttle and spark timing to improve engine efficiency and minimize emissions.

However, the inventors herein have recognized potential issues relating to such methods of managing lash in a vehicle driveline. Specifically, lack of lead information on a driver intent (such as whether the driver will eventually brake or accelerate) to guide adjustments in driveline torque may create slow vehicle response and reduce vehicle drivability. For example, a driveline torque may be adjusted during an accelerator pedal tip-out assuming that the operator is going to apply the brake pedal. However, if the operator does not apply the brake pedal but coasts and then reapplies the accelerator pedal, then the driveline torque may unnecessarily transition through the lash zone multiple times. As a result, repeated lash adjustments may slow down vehicle response and also create additional driver discomfort.

Thus in one example, some of these issues may be at least partly addressed by a method for a vehicle engine, comprising: in response to an operator foot-off pedal event, distinguishing between a driver intent to brake or coast based on one or more of operator foot motion inside the vehicle and traffic patterns outside the vehicle; and varying lash adjustments during torque transition through a lash region following the operator foot-off accelerator pedal event based on the driver intent. In this way, torque adjustments may be selected that better manage movement through a lash region based on an upcoming torque transition.

As one example, responsive to a foot-off accelerator pedal event, a controller may initiate powertrain braking to reduce torque. In addition, the controller may infer and distinguish a driver intent to brake from a driver intent to coast based on the output of a camera inside a vehicle foot-well area, the output from a traffic sensor, operator drive history, etc. Based on the inferred driver intent, lash adjustments for the driveline may be varied. For example, based on a driver foot motion towards a brake pedal and/or in response to significant traffic ahead of the vehicle following the foot-off accelerator pedal event, the controller may infer that the driver is likely to brake and may adjust the lash in the vehicle driveline by providing a slight negative torque (since substantial negative torque is expected thereafter during the braking event). In addition, the controller may initiate a transition through the lash region to a creep torque later. As another example, based on driver foot remaining near the accelerator brake pedal and/or traffic clearing in front of the vehicle following the accelerator foot-off pedal event, the controller may infer that the driver is likely to coast and may maintain a slight positive torque in the driveline (since substantial positive torque is expected thereafter during the coasting event) and may not transition through the lash region unless the operator applies the brake pedal. Alternatively, the controller may initiate a transition through the lash region to a creep torque earlier.

The approach described here may confer several advantages. For example, the method allows driveline torque adjustments to be made in a timely manner to improve vehicle response and improve drivability. By using output from the foot camera and traffic sensor to determine if the operator intends to brake or coast, the expected torque profile following a foot-off pedal event may be better predicted, allowing for lash adjustments to be accordingly performed. By adjusting the amount and rate of powertrain braking torque applied following the foot-off pedal event based on the predicted torque profile, torque transitions through the lash zone may be conducted with improved efficiency. By maintaining a slight positive torque in the driveline when the driver is anticipated to coast, frequent transitions through the lash region are reduced, providing fuel economy and NVH benefits. Consequently, vehicle response during lash adjustments may be improved, improving vehicle drivability, and minimizing torque variations. By improving lash adjustments, driveline component life may be extended.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 5 shows example graphical output for adjusting lash in a vehicle driveline based on foot motion and traffic movements outside the vehicle.

DETAILED DESCRIPTION

Figure 1:
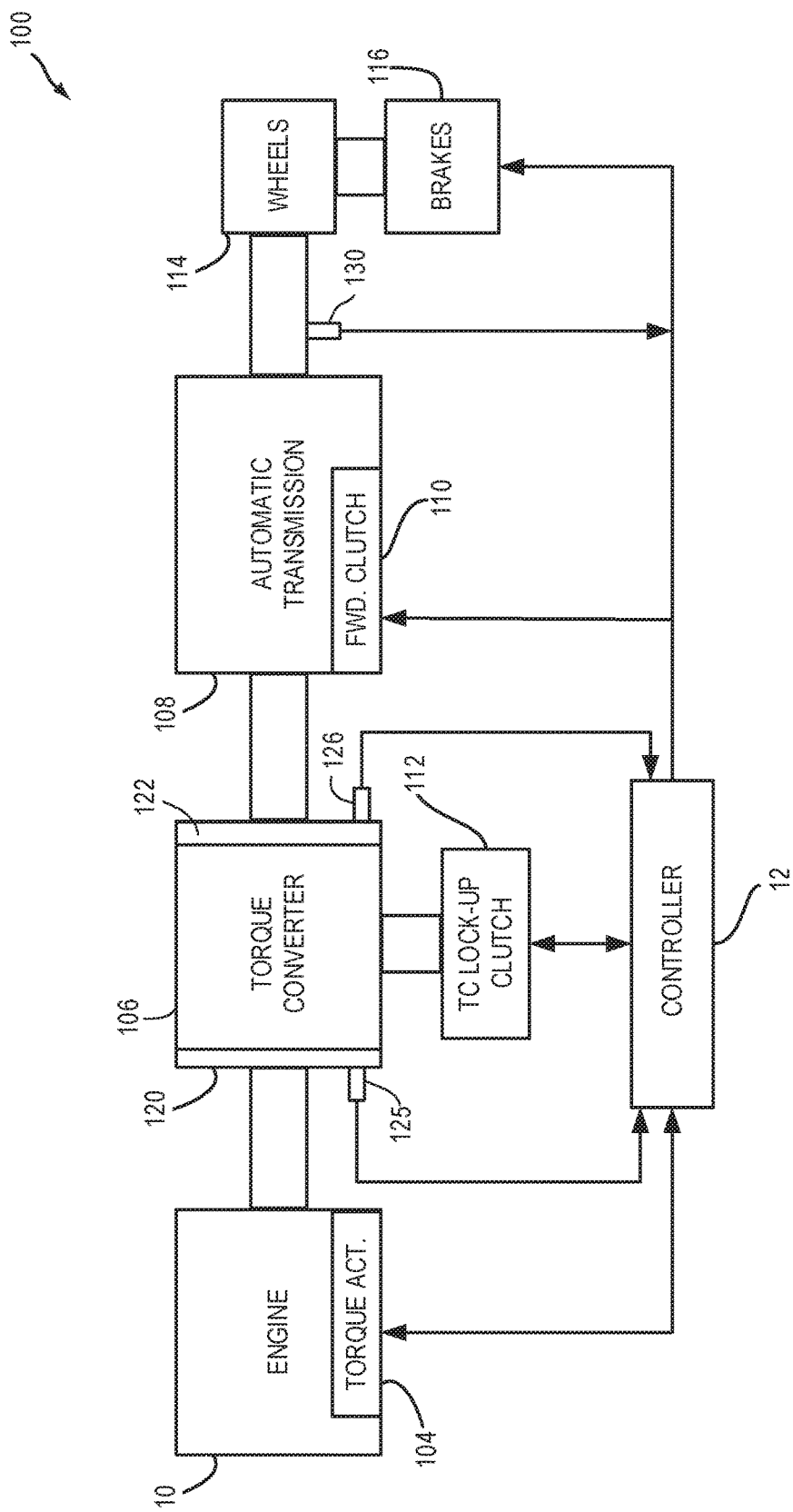
FIG. 1 represents an engine with a transmission and various components.
Figure 2:
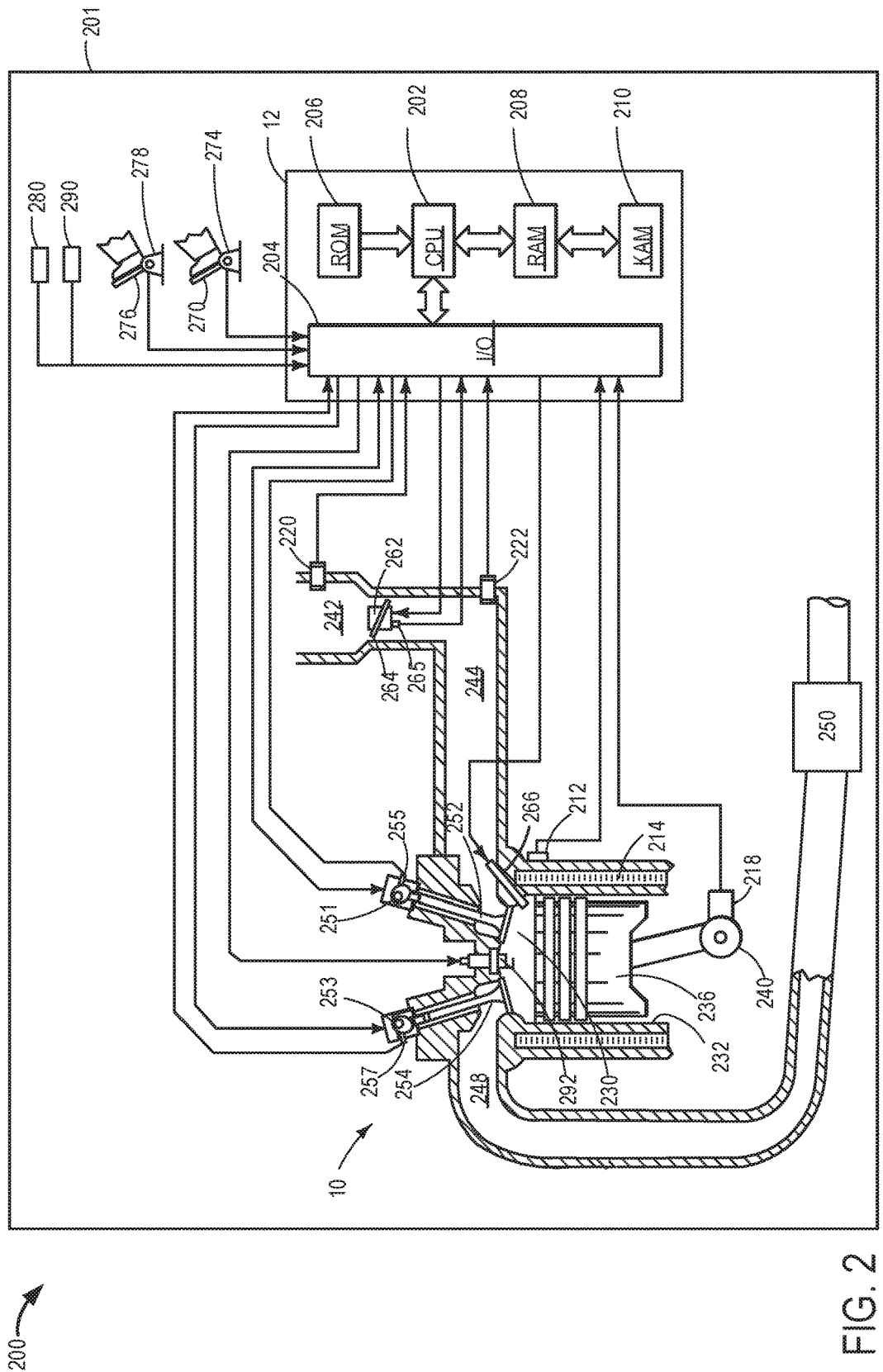
FIG. 2 shows a schematic depiction of a combustion chamber of an engine system.

The following description relates to systems and methods for managing lash in a vehicle driveline coupled to an engine system, such as the engine system of FIG. 2 in the vehicle system of FIG. 1. The approach provides an improved method for adjusting driveline torque based on operator foot motion captured by a foot camera inside a vehicle, and traffic patterns captured by a camera looking outside the vehicle. A controller may be configured to perform a control routine, such as the example routine of FIG. 3 to adjust torque in a vehicle driveline based on driver intent. The controller may infer driver intent based on operator foot motion captured by a foot camera inside a vehicle and traffic movements outside the vehicle, as described with reference to FIG. 4. FIG. 5 shows an example graphical output for driveline lash adjustments in a vehicle based on predicted driver intent. By utilizing the systems and methods described herein, the technical effect of adjusting lash in a vehicle driveline based on operator foot motion inside the foot well and traffic movements outside the vehicle to keep torque variations within allowable thresholds, may be achieved.

FIG. 1 shows a block diagram of a vehicle drive-train 100. Drive-train 100 may be powered by engine 10. In one example, engine 10 may be a gasoline engine. In alternate examples, other engine configurations may be employed, for example, a diesel engine. Engine 10 may be started with an engine starting system (not shown). Further, engine 10 may generate or adjust torque via torque actuator 104, such as a fuel injector, throttle, etc.

An engine output torque may be transmitted to torque converter 106 to drive an automatic transmission 108 by engaging one or more gear clutches (to engage gears), including forward clutch 110, where the torque converter may be referred to as a component of the transmission. Further, the gear clutches including forward clutch 110 may be needed to activate a plurality of fixed transmission gear ratios. As such, automatic transmissions may engage several clutches to transmit power to the wheels. However, for purposes of simplification, in the present description, any such combinations may be referred to as engaging a forward clutch. Torque converter 106 includes an impeller 120 that transmits torque to turbine 122 via hydraulic fluid. One or more clutches may be engaged to change mechanical advantage between the engine vehicle wheels 114. Impeller speed may be determined via speed sensor 125, and turbine speed may be determined from speed sensor 126 or from vehicle speed sensor 130. The output of the torque converter may in turn be controlled by torque converter lock-up clutch 112. As such, when torque converter lock-up clutch 112 is fully disengaged, torque converter 106 transmits torque to automatic transmission 108 via fluid transfer between the torque converter turbine and torque converter impeller, thereby enabling torque multiplication. In contrast, when torque converter lock-up clutch 112 is fully engaged, the engine output torque is directly transferred via the torque converter clutch to an input shaft (not shown) of transmission 108. Alternatively, the torque converter lock-up clutch 112 may be partially engaged, thereby enabling the amount of torque relayed to the transmission to be adjusted. A controller 12 may be configured to adjust the amount of torque transmitted by the torque converter by adjusting the torque converter lock-up clutch in response to various engine operating conditions, or based on a driver-based engine operation request. Fluid within the automatic transmission may be pressurized via a mechanical pump (not shown) driven via the engine. In some examples, the automatic transmission further includes a one-way clutch (not shown) that allows the engine to provide torque to the automatic transmission and wheels, but does not allow the wheels to supply torque to the engine.

Torque output from the automatic transmission 108 may in turn be relayed to wheels 114 to propel the vehicle. Specifically, automatic transmission 108 may adjust an input driving torque at the input shaft (not shown) responsive to a vehicle traveling condition before transmitting an output driving torque to the wheels.

Further, wheels 114 may be locked by engaging wheel brakes 116. In one example, wheel brakes 116 may be engaged in response to the driver pressing his foot on a brake pedal (not shown). In the similar way, wheels 114 may be unlocked by disengaging wheel brakes 116 in response to the driver releasing his foot from the brake pedal.

During conditions when the engine torque (or driveline torque) changes direction, such as when going from positive to negative torque, or when going from negative to positive torque, lash may occur. This may be caused due to lost motion caused by slack or clearance within various driveline components when torque changes direction, such as during a vehicle acceleration or deceleration event. In addition, motion of powertrain mounts may be functionally similar to powertrain lash wherein the lash-like property of the mounts may be dynamically altered via adjustments to mount stiffness. Frequent transitions through a lash region (defined by a torque region on either side of zero torque) can result in NVH issues and disturbance to the vehicle driver.

Responsive to a foot-off an accelerator pedal, a controller may initiate powertrain braking to reduce the drivetrain torque to a deceleration torque level. In an effort to limit wheel brake wear and improve fuel economy, the kinetic energy of the vehicle may be harvested during conditions when a vehicle operator removes their foot from an accelerator pedal. The harvested kinetic energy can then be used to idle the engine idle without fuel (that is, provide a DFSO condition), and power an accessory drive, such as an alternator, an AC compressor, a vacuum pump, a transmission hydraulic pump, etc. The engine controller may transition between negative and positive powertrain torque slowly enough to minimize vehicle occupant disturbance but fast enough so that the fuel economy benefits are not lost. As elaborated herein, by better anticipating driver intent and traffic requirements, an engine controller may reduce a frequency of torque transitions, as well as better infer lead information on the occurrence of an upcoming torque transition.

The controller may select between providing powertrain braking as a way of conserving brake wear (or being independent of wheel brake control) and providing powertrain braking in an effort to turn the accessory drive or idle the engine with little or no fuel. For example, powertrain braking may be provided via a powertrain deceleration approach with fueling enabled wherein engine air flow rate is minimized by closing an intake throttle and optionally minimizing air trapping via valve timing adjustments. At the same time, engine fueling may be adjusted based on the airflow to maintain an air-fuel ratio at or around stoichiometry. A transmission coupled to the engine may be held in-gear (such as with a forward clutch engaged) and with a torque converter locked so that the torque converter can efficiently transmit negative torque. The controller may then command the transmission into a gear wherein the speed ratio enables the engine to be run at or near an idle speed (or at an engine speed higher than idle speed if higher levels of powertrain deceleration are desired). The controller may also engage an AC compressor clutch to raise an AC pressure and thus its stored energy. As such, this increases the AC load on the engine. The controller may also increase an alternator field (or increase alternator output) to maximize the energy storage rate (assuming that the battery has additional storage capacity).

As an alternate example, powertrain braking may be provided via a powertrain deceleration approach with fueling disabled wherein the transmission is held in gear and the torque converter is locked while fueling is disabled. As with the fuel-on approach, one or more engine loads, such as the AC compressor load and the alternator load, on the engine may be increased. As such, the fuel-off approach may improve the fuel economy while increasing the powertrain braking if it reduces friction braking compared to the fuel-on powertrain deceleration approach.

In particular, powertrain braking is used to reduce the drivetrain torque to a level outside a lash region of the powertrain, the rate of reducing based on the displacement of the accelerator pedal during the foot-off pedal event. Then, further powertrain braking is applied alongside lash adjustments to transition through the lash region during a positive-to-negative torque reversal. The powertrain torque is then reduced to a deceleration torque level (slight negative torque), from where the torque is then increased to a creep torque level (slight positive torque) via another transition through the lash region during a negative-to-positive torque reversal Initiation of the lash transition to the creep torque level is adjusted based on the driver intent, with the initiation performed earlier when the driver intends to coast, and the initiation performed later when the driver intends to brake.

In one example, lash adjustments during torque reversals may be made by coupling the engine to drive wheels in such a way as to let the engine transmit both positive and negative torque. Subsequently, the engine intake throttle may start to be closed. The intake throttle may be closed at a faster rate until the desired torque point (which may be the zero torque point) is approached. A slower throttle motion may be applied prior to reaching the desired torque point or zero torque in order to reduce the rate of torque change in that region. Once the torque transition is complete, increased negative torque may be applied at a higher rate of change.

A mechanical oil pump (not shown) may be in fluid communication with automatic transmission 108 to provide hydraulic pressure to engage various clutches, such as forward clutch 110 and/or torque converter lock-up clutch 112. The mechanical oil pump may be operated in accordance with torque converter 106, and may be driven by the rotation of the engine or transmission input shaft, for example. Thus, the hydraulic pressure or flow rate generated in mechanical oil pump may increase as an engine speed increases, and may decrease as an engine speed decreases.

Referring to FIG. 2, a schematic diagram showing one cylinder of a multi-cylinder engine 10 in an engine system 200, which may be included in a propulsion system, such as in vehicle 201. In one example, engine system 200 may be included in vehicle drive-train 100 of FIG. 1.

The engine 10 may be controlled at least partially by a control system including a controller 12 and by inputs from a vehicle operator via a first input device 270 and a second input device 276. In this example, the first input device 270 includes an accelerator pedal (herein also referred to as a go pedal) and a first pedal position sensor 274 for generating a proportional accelerator pedal position signal. The second input device 276 includes a brake pedal and a second pedal position sensor 278 for generating a proportional brake pedal position signal.

Vehicle 201 may include one or more sensors for providing situational awareness. As an example, a foot-well sensor, for example configured as a foot camera 280, located inside a vehicle foot-well region, may scan the foot-well region and monitor motion of operator's foot in the foot-well region, in particular, the motion of the operator's foot in the vicinity of each of the accelerator pedal and brake pedal, and relay a motion signal to controller 12. For example, the sensor may provide information regarding a position of the operator's foot relative to each of the accelerator pedal and the brake pedal during pedal tip-in and tip-out events, as well as immediately before and after such events.

The controller may also receive input from a range sensor 290 configured to provide a distance to objects in the path of vehicle 201. Range sensor 290 may be RADAR, light detecting and ranging (LiDAR), sonar, or other known distance ranging device. In one example, range sensor 290 may be configured as a traffic camera for scanning a region ahead of/in front of vehicle 201. For example, the sensor 290 may provide input regarding a closing rate of vehicle 201 (a time taken for vehicle 201 to close into a vehicle immediately ahead of it), a clearance ahead of the vehicle, etc.

Still other situational awareness sensors may include, for example, global positioning systems (GPS), radio receivers, etc.

A combustion chamber 230 of the engine 10 may include a cylinder formed by cylinder walls 232 with a piston 236 positioned therein. The piston 236 may be coupled to a crankshaft 240 so that reciprocating motion of the piston is translated into rotational motion of the crankshaft. The crankshaft 240 may be coupled to at least one drive wheel of a vehicle via an intermediate transmission system. Further, a starter motor may be coupled to the crankshaft 240 via a flywheel to enable a starting operation of the engine 10.

The combustion chamber 230 may receive intake air from an intake manifold 244 via an intake passage 242 and may exhaust combustion gases via an exhaust passage 248 to an exhaust treatment device 250. The intake manifold 244 and the exhaust passage 248 can selectively communicate with the combustion chamber 230 via respective intake valve 252 and exhaust valve 254. In some examples, the combustion chamber 230 may include two or more intake valves and/or two or more exhaust valves.

In this example, the intake valve 252 and exhaust valve 254 may be controlled by cam actuation via respective cam actuation systems 251 and 253. The cam actuation systems 251 and 253 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 252 and exhaust valve 254 may be determined by position sensors 255 and 257, respectively. In alternative examples, the intake valve 252 and/or exhaust valve 254 may be controlled by electric valve actuation. For example, the cylinder 230 may alternatively include an intake valve controlled via electric valve actuation and an exhaust valve controlled via cam actuation including CPS and/or VCT systems.

A fuel injector 266 is shown coupled directly to combustion chamber 230 for injecting fuel directly therein in proportion to the pulse width of a signal received from the controller 12. In this manner, the fuel injector 266 provides what is known as direct injection of fuel into the combustion chamber 230. The fuel injector may be mounted in the side of the combustion chamber or in the top of the combustion chamber, for example. Fuel may be delivered to the fuel injector 266 by a fuel system (not shown) including a fuel tank, a fuel pump, and a fuel rail. In some examples, the combustion chamber 230 may alternatively or additionally include a fuel injector arranged in the intake manifold 244 in a configuration that provides what is known as port injection of fuel into the intake port upstream of the combustion chamber 230.

Spark is provided to combustion chamber 230 via spark plug 292. The ignition system may further comprise an ignition coil (not shown) for increasing voltage supplied to spark plug 266. In other examples, such as a diesel, spark plug 266 may be omitted.

The intake passage 242 may include a throttle 262 having a throttle plate 264. In this particular example, the position of throttle plate 264 may be varied by the controller 12 via a signal provided to an electric motor or actuator included with the throttle 262, a configuration that is commonly referred to as electronic throttle control (ETC). In this manner, the throttle 262 may be operated to vary the intake air provided to the combustion chamber 230 among other engine cylinders. The position of the throttle plate 264 may be provided to the controller 12 by a throttle position signal. The intake passage 242 may include a mass air flow sensor 220 and a manifold air pressure sensor 222 for sensing an amount of air entering engine 10.

The controller 12 is shown in FIG. 2 as a microcomputer, including a microprocessor unit 202, input/output ports 204, an electronic storage medium for executable programs and calibration values shown as read only memory chip 206 (e.g., non-transitory memory) in this particular example, random access memory 208, keep alive memory 210, and a data bus. The controller 12 may receive various signals from sensors coupled to the engine 10, in addition to those signals previously discussed, including measurement of inducted mass air flow (MAF) from the mass air flow sensor 220; engine coolant temperature (ECT) from a temperature sensor 212 coupled to a cooling sleeve 214; an engine position signal from a Hall effect sensor 218 (or other type) sensing a position of crankshaft 240; throttle position from a throttle position sensor 265; manifold absolute pressure (MAP) signal from the sensor 222; accelerator signal from the first pedal sensor 274; brake signal from the second pedal sensor 278; inside vehicle motion signal from camera 280, and outside vehicle motion signal from range sensor 290. An engine speed signal may be generated by the controller 12 from crankshaft position sensor 218. Manifold pressure signal also provides an indication of vacuum, or pressure, in the intake manifold 244. Note that various combinations of the above sensors may be used, such as a MAF sensor without a MAP sensor, or vice versa. During engine operation, engine torque may be inferred from the output of MAP sensor 222 and engine speed. Further, the MAP sensor, along with the detected engine speed, may be a basis for estimating charge (including air) inducted into the cylinder. In one example, the crankshaft position sensor 218, which is also used as an engine speed sensor, may produce a predetermined number of equally spaced pulses every revolution of the crankshaft.

In still further examples, vehicle 201 may include a Global positioning system (GPS) receiver receiving satellite positioning data via radio signals transmitted by a satellite. The GPS receiver may receive positioning data that may be used to index maps to determine traffic patterns or signals, road grade, and other road features such as distance to leading vehicle. Further still, a radio receiver receiving radio signals from a stationary transmitter may be used to learn traffic patterns (such as based on locations of traffic accidents and backups). In another example, information on traffic patterns or signals, road grade, and other road features such as distance to leading vehicle may be gleaned from vehicle-to-vehicle data broadcasting and receiving systems.

The storage medium read-only memory 206 can be programmed with computer readable data representing non-transitory instructions executable by the processor 202 for performing the methods described below as well as other variants that are anticipated but not specifically listed.

During operation, each cylinder within engine 10 typically undergoes a four stroke cycle: the cycle includes the intake stroke, compression stroke, expansion stroke, and exhaust stroke. During the intake stroke, generally, the exhaust valve 254 closes and intake valve 252 opens. Air is introduced into combustion chamber 230 via intake manifold 244, and piston 236 moves to the bottom of the cylinder so as to increase the volume within combustion chamber 230. The position at which piston 236 is near the bottom of the cylinder and at the end of its stroke (e.g., when combustion chamber 230 is at its largest volume) is typically referred to by those of skill in the art as bottom dead center (BDC).

During the compression stroke, intake valve 252 and exhaust valve 254 are closed. Piston 236 moves toward the cylinder head so as to compress the air within combustion chamber 230. The point at which piston 236 is at the end of its stroke and closest to the cylinder head (e.g., when combustion chamber 230 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 292, resulting in combustion.

During the expansion stroke, the expanding gases push piston 236 back to BDC. Crankshaft 240 converts piston movement into a rotational torque of the rotary shaft. Finally, during the exhaust stroke, the exhaust valve 254 opens to release the combusted air-fuel mixture to exhaust manifold 248 and the piston returns to TDC. Note that the above is shown merely as an example, and that intake and exhaust valve opening and/or closing timings may vary, such as to provide positive or negative valve overlap, late intake valve closing, or various other examples.

As described above, FIG. 2 shows only one cylinder of a multi-cylinder engine, and each cylinder may similarly include its own set of intake/exhaust valves, fuel injector, spark plug, etc.

As will be appreciated by someone skilled in the art, the specific routines described below in the flowcharts may represent one or more of any number of processing strategies such as event driven, interrupt-driven, multi-tasking, multi-threading, and the like. As such, various acts or functions illustrated may be performed in the sequence illustrated, in parallel, or in some cases omitted. Like, the order of processing is not necessarily required to achieve the features and advantages, but is provided for ease of illustration and description. Although not explicitly illustrated, one or more of the illustrated acts or functions may be repeatedly performed depending on the particular strategy being used. Further, these Figures graphically represent code to be programmed into the computer readable storage medium in controller 12 to be carried out by the controller in combination with the engine hardware, as illustrated in FIG. 2.

Based on input from one or more of the above-mentioned sensors, controller 12 may adjust one or more actuators, such as fuel injector 266, throttle 262, spark plug 292, intake/exhaust valves and cams, etc. The controller may receive input data from the various sensors, process the input data, and trigger the actuators in response to the processed input data based on instruction or code programmed therein corresponding to one or more routines. For example, in response to receiving a foot motion signal from camera 280, the controller may adjust driveline torque in a vehicle in order to reduce torque variations. In one example, based on a driver moving foot towards a brake pedal following a foot-off pedal event, it may be inferred that the driver intends to brake. A controller may be adjusted to provide a slight negative torque, since substantial negative torque may be expected thereafter. Example control routines will be described later with regard to FIGS. 3-4.

In this way, the system of FIGS. 1-2 enables a vehicle system comprising: an operator foot-well region including an accelerator pedal, a brake pedal, and a foot-well sensor; a sensor coupled to the vehicle system for estimating a gap between the vehicle system and a leading vehicle; an engine including a fuel injector and an intake throttle valve; and a controller. The controller may be configured with computer-readable instructions stored on non-transitory memory for: in response to a foot-off accelerator pedal event, applying a first powertrain brake torque to reduce engine torque to a threshold torque above a lash region via adjustments to a duty cycle of the fuel injector and an opening of the intake throttle valve; inferring a driver intent to coast or brake based on one or more of the traffic sensor and the foot-well sensor; and selectively performing a lash adjustment through the lash region based on the inferred driver intent. As an example, the selectively performing the lash adjustment includes: performing the lash adjustment when the inferred driver intent includes braking; and not performing the lash adjustment when the inferred driver intent includes coasting. The selectively performing the lash adjustment further includes: initiating the lash adjustment through the lash region earlier when the inferred driver intent includes coasting; and initiating the lash adjustment through the lash region later when the inferred driver intent includes braking.

Figure 3:
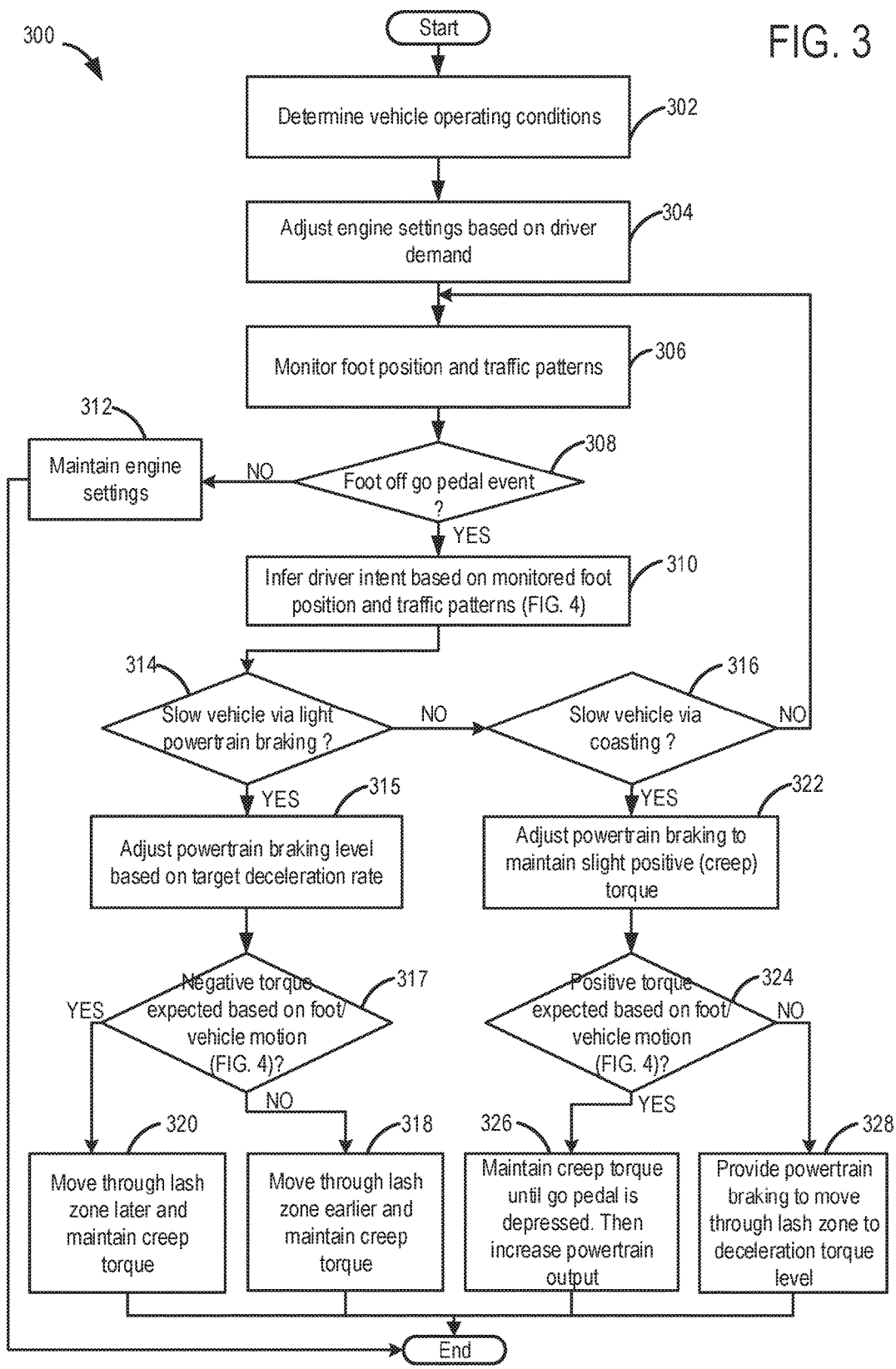
FIG. 3 represents a flowchart for adjusting torque in a vehicle driveline.

In another example, lash adjustments during engine torque reversals may be made when an engine is coupled to drive wheels such that the engine transmits both positive and negative torque. Subsequently, an engine actuator (such as an engine intake throttle) may be adjusted to reduce the rate of torque change during torque transitions from positive to negative or torque changes from negative to positive (e.g., at a slower than a threshold rate of torque change). Thereafter, the engine actuator may be adjusted to increase the rate of torque change (e.g., at higher than the threshold rate of torque change). Referring to FIG. 3, an example method 300 is shown for adjusting powertrain torque based on driver intent as inferred from driver foot motion inside a foot-well and traffic movements outside the vehicle. Instructions for carrying out method 300 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, method 300 includes estimating and/or measuring vehicle and engine operating conditions. Operating conditions may include but are not limited to driver torque demand, electrical load, mass air flow, manifold absolute pressure, engine speed, engine load, accelerator pedal position, brake pedal position, throttle position, vehicle speed, engine temperature, and vehicle clearance (that is, a gap between the given vehicle and a leading vehicle immediately ahead of the given vehicle, as determined based on traffic movements outside the given vehicle). After determining vehicle operating conditions, method 300 proceeds to 304.

At 304, method 300 may include adjusting engine settings based on torque demand. For example, throttle opening, cylinder fueling, torque converter slip settings, boost pressure settings, etc., may be adjusted based on torque demand. In particular, the controller may operate the engine combusting air and fuel to provide a demanded torque. The demanded torque may include a driver demanded torque as determined from accelerator pedal position, and the demanded torque may also include torque to keep the engine at or above idle speed and torque (e.g., creep torque) to move the vehicle at a low speed when the driver is not applying the accelerator pedal. Further, the vehicle's transmission may be shifted to neutral while the engine idles (e.g., neutral idle).

Next at 306, the routine may monitor operator foot position and traffic movements outside the vehicle while the vehicle is being operated. As such, the monitoring may be performed during the entirety of the vehicle drive cycle. Operator foot position may be monitored based on input from a sensor or camera scanning a foot-well region of the vehicle. Traffic movements outside the vehicle may be determined based on input from a sensor or camera scanning a region in front of the given vehicle. Monitoring operator foot position may include monitoring the motion of the operator foot relative to each of the accelerator pedal and the brake pedal. For example, it may be determined if the operator is applying or releasing the accelerator pedal or the brake pedal, if the operator is hovering over one of the pedals, if the operator's foot is moving from pedal to the other pedal, etc. Further, during any accelerator or brake pedal events, a rate of pedal displacement (during both applying and releasing of the pedal), as well as angle of pedal application/release may be monitored. Further still, the controller may learn an operator's driving pattern (or update a learned pattern stored in the controller's memory) based on a frequency of pedal application, a sequence of pedal application, durations elapsed between application/release of one pedal and release/application of the other pedal, intervals between successive applications of the same pedal, etc. For example, based on the rate, frequency, sequence, and intervals of pedal application, the controller may infer if the operator has a driving preference for performance or for fuel economy. As elaborated herein at FIG. 4, based on the driver's foot motion, the controller may infer and distinguish a driver intent to coast from a driver intent to brake.

Monitoring traffic movements and traffic patterns may include determining a number of vehicles within a defined radius of the given vehicle (e.g., vehicles ahead and to the side of the given vehicle), and determining a gap or clearance between the given vehicle and a leading vehicle (e.g., a distance from the front bumper of the given vehicle from a rear bumper of a vehicle immediately ahead of it), as well as a closing speed (speed to close in to leading vehicle). Monitoring traffic patterns may further include determining if traffic outside the vehicle is slowing down (e.g., if the gap/clearance to the leading vehicle is decreasing) or clearing up (e.g., if the gap/clearance to the leading vehicle is increasing). Further still, the monitoring of traffic patterns may be used to determine road conditions, such as road grade (e.g., whether an uphill or a downhill segment is approaching). As elaborated herein at FIG. 4, based on the traffic pattern, the controller may infer and distinguish a driver intent to coast from a driver intent to brake.

Next at 308, it may be determined if a foot-off go pedal event has occurred. In one example, a foot-off go pedal event may be confirmed if an accelerator pedal tip-out event is detected by a pedal position sensor based on the release of the accelerator pedal. As another example, a foot-off go pedal event may be confirmed based on the position of a driver's foot with respect to the accelerator pedal, as determined by a sensor/camera in the foot-well region. If a foot-off go pedal event is not confirmed, at 312, the method includes maintaining engine settings, and then the routine exits.

To improve drive cycle fuel economy, when a driver releases an accelerator pedal, a controller may decelerate the driveline torque to a negative torque. For example, the vehicle may be decelerated via driveline or powertrain braking at a constant or consistent rate until the driver request torque for acceleration, or until the vehicle speed is at zero speed or within a threshold of zero speed. This provides several advantages. First, a fuel cut-off responsive to the foot-off go pedal reduces fuel usage. Then, the engine is idled using energy that would otherwise have gone into brake heat. Also, a front end accessory drive (FEAD) system may be powered using energy that would have otherwise gone into brake heat. Further, the application of a deceleration torque to a slightly negative torque level upon operator foot-off the accelerator pedal allows for the vehicle to slow down quicker.

Thus, by using at least some of the vehicle's kinetic energy to recover at least a fraction of the energy improves fuel economy by reducing the energy loss to friction braking. Thus, even if the unintended powertrain braking which tends to occur at foot-off-accelerator is not conducive to fuel economy, the fuel economy gains achieved via the minimization of powertrain torque reversals outweighs any fuel economy loss incurred due to the powertrain braking.

When the driver wants to slow down the vehicle, they may take their foot off the accelerator pedal. As a result, a fixed level of deceleration is achieved, the fixed level resulting from road load, aerodynamic (drag) loads, and powertrain braking. The pedal itself may not be easily controllable between a given level of powertrain braking and zero powertrain braking. Consequently, more powertrain braking may occur than was desired. As elaborated herein, if the operator foot remains near the go pedal or the inferred state of the traffic indicates that significant deceleration is not likely to be desired, it may be advantageous to circumvent the transition to powertrain braking which would include a transition from positive to negative torque (and a likely return to positive torque). As such, the move to the slightly negative deceleration torque level requires a transition through the lash region of the drivetrain (which is defined by a band of torque on either side of zero torque), and a corresponding lash adjustment. As such, this may be a first lash adjustment performed during a positive-to-negative torque reversal. In addition, after reaching the slight negative deceleration torque level, the powertrain is held in neutral idle for a while before powertrain torque is increased to a slight positive creep torque level via second lash adjustment during negative-to-positive torque reversal. Not only do the lash transitions result in NVH issues, but the lash adjustments can impact the fuel economy gains made earlier. The inventors herein have recognized that a controller may decide how much driveline braking to apply and whether to and when to put the driveline torque into a state with slightly negative torque, slightly positive torque, or neutral, following the foot-off accelerator pedal event based on the driver's subsequent intent. In particular, if an imminent driver brake command is anticipated, then it may be advantageous to provide more driveline brake torque and transition through the lash region to get to the slightly negative deceleration torque level as quickly as possible, and then transition through the lash region to get to the creep torque level later. In one example, creep torque may be reached at vehicle speeds less than 10 kilometers per hour when a vehicle with an unlocked torque converter travels on a flat road. However, if an imminent driver brake command is not anticipated, or if an imminent driver positive torque command is anticipated, then it may be advantageous to coast by maintaining a slightly positive driveline torque (or be in neutral or idle) while staying outside the lash region rather than commanding powertrain braking. In this case, lash transitions are not performed, and an instantaneous smooth acceleration can be performed when the driver demands a torque increase, improving drivability. Alternatively, it may be advantageous to provide less driveline brake torque and transition through the lash region to get to the slightly negative deceleration torque level slowly, and then transition through the lash region to get to the creep torque level earlier. In other words, lash adjustments during torque transitions through a lash region following an operator foot-off pedal event may be varied based on the driver intent.

Thus, if the foot-off accelerator pedal event is confirmed, the routine proceeds to 310, wherein the controller may infer and distinguish between the driver intent to brake or coast (responsive to the foot-off accelerator pedal event) based on one or more or each of the monitoring of the operator foot position and the traffic patterns. As an example, a driver intent to brake may be inferred based on the driver moving their foot towards (or hovering around) the brake pedal following the foot-off go pedal event and/or traffic slowing down outside the vehicle (or a decrease in vehicle closing/clearance) following the foot-off accelerator pedal event. A negative driveline torque may be expected during such conditions. As another example, a driver intent to coast may be inferred based on the driver hovering their foot over or around the accelerator pedal following the foot-off go pedal event and/or based on traffic clearing outside the vehicle (or an increase in vehicle closing/clearance). A positive driveline torque may be expected during such conditions. Distinguishing between driver intent to brake or coast may further include, as non-limiting examples, indicating driver intent to brake responsive to operator foot motion towards a brake pedal and indicating driver intent to coast responsive to operator foot motion near an accelerator pedal. The operator foot motion inside the vehicle may be based on input from a camera scanning a foot-well region of the vehicle. As another example, distinguishing between driver intent to brake or coast may include indicating driver intent to brake responsive to a traffic pattern indicative of a smaller clearance (or closing rate) ahead of the vehicle and indicating driver intent to coast responsive to a traffic pattern indicative of a larger clearance (or closing rate) ahead of the vehicle. The traffic pattern and clearance outside the vehicle may be based on input from a camera scanning a region in front of, or ahead of, the vehicle. The details of inferring driver intent based on operator foot motion inside the vehicle and traffic patterns outside the vehicle are discussed in detail at FIG. 4.

After inferring the driver intent, at 314, the routine may determine if vehicle slowing via light powertrain braking is required. In one example, an intent to slow the vehicle down via light powertrain braking may be inferred if the driver moves their foot towards the brake pedal or if the closing rate/clearance between the given vehicle and the vehicle in front decreases (such as when traffic ahead of the given vehicle slows down). If the answer is YES, the routine proceeds to 315 wherein the controller may adjust one or more engine actuators to provide a powertrain braking level that provides a target deceleration rate while taking advantage of fuel economy resulting from using the vehicle's stored kinetic energy to idle the engine and power the FEAD. Herein, the light powertrain braking is applied before a brake pedal is actually applied and may include a less than threshold amount of powertrain braking applied to decelerate the vehicle at a slower rate. In comparison, the powertrain braking applied when the brake pedal is actually applied may be higher than the threshold amount and may decelerate the vehicle at a faster rate.

As an example, the controller may reduce engine torque via powertrain braking to a threshold torque level outside a lash region of the driveline, and then transition through the lash region via a first lash adjustment (during a positive to negative torque transition through the lash region) to reach a deceleration torque level. A rate of powertrain braking to the threshold torque level as well as a timing of the first lash adjustment may be adjusted based on a rate of pedal displacement during the operator foot-off accelerator pedal event. For example, if the pedal is displaced at a higher rate (e.g., a higher closing rate of the pedal), then a higher rate of powertrain braking (and/or higher amount of powertrain braking) may be applied and the first lash adjustment may be performed earlier.

It will be appreciated that the powertrain braking applied and the timing of the first lash adjustment may be further based on a learned operator driving pattern, the operator driving pattern including a preference for performance or a preference for fuel economy. As an example, based on a frequency, order, sequence, interval, and degree of application of each of the accelerator pedal and the brake pedal by the operator, the controller may learn a driving pattern. For example, the controller may learn if the operator has a lead foot, if they brake hard and often, if they prefer to coast, etc. In one example, when the operator driving pattern reflects a preference for fuel economy (over performance), the amount and rate of driveline braking applied following the foot-off accelerator pedal may be smaller such that the vehicle decelerates to the deceleration torque level slower, and the first lash adjustment occurs later during the torque transition. In comparison, when the operator driving pattern reflects a preference for performance (over fuel economy), the amount and rate of driveline braking applied following the foot-off accelerator pedal may be larger such that the vehicle decelerates to the deceleration torque level faster, and the first lash adjustment occurs earlier during the torque transition.

Torque modulation during the lash crossing may be achieved via one or more engine load end-effectors. For example, an engine throttle or an air intake valve timing may be adjusted to modulate torque during torque reversals. In another example, spark timing may be retarded, and accessory engine loads may be increased to quickly reduce torque during torque transitions through the lash zone. Applying the powertrain braking responsive to the foot-off accelerator pedal event includes switching off fuel to the engine cylinders, and shifting the transmission into gear with the torque converter locked while the engine spins unfueled. Optionally, one or more engine loads may also be increased to enable a higher driveline braking and to enable the first lash adjustment to be performed earlier. For example, an air conditioner compressor load and/or an alternator load on the engine may be increased. Further still, driveline braking torque may be increased by adjusting the engine valve timing to increase pumping losses. The powertrain torque may then be held at the deceleration torque level before driveline torque is increased to a creep torque level following a second lash adjustment during a negative to positive transition through the lash region. As elaborated below, a timing of the second lash adjustment may be varied based on whether and how soon an increase in torque demand is expected, as based on the driver intent.

Next at 317, method 300 may determine if negative torque is expected in the driveline. That is, it is determined if there is an indication that the driver may brake. The determination may be based on the monitored operator foot motion inside the foot-well region and/or based on traffic patterns ahead of the vehicle. In one example, negative torque is expected responsive to the driver moving their foot towards the brake pedal (or hovering over the brake pedal), and/or traffic slowing down outside the vehicle resulting in a larger closing rate or smaller clearance between the given vehicle and a leading vehicle. Details of determining expected negative torque based on driver foot motion and traffic movements outside the vehicle are discussed at FIG. 4. If negative powertrain torque is expected, the routine proceeds to 318.

At 318, in response to the driver intent to brake, the controller performs the second lash adjustment by moving through the lash region later before maintaining creep torque. Herein, when the driver intent includes braking, a duration between the first lash adjustment and the second lash adjustment is larger, and the powertrain torque is held at the slight negative deceleration torque level longer. By transitioning through the lash zone later when negative driveline torque may be expected, engine may be prepared to quickly convert vehicle kinetic energy to idle and FEAD power, keeping torque variations to allowable levels while improving fuel economy and vehicle response. In addition, additional negative driveline torque can be provided while the driveline is already at the deceleration torque level, obviating the need for the second lash adjustment. By reducing frequent lash region transitions, fuel economy is improved and NVH issues are reduced.

If negative driveline torque is not expected the routine proceeds to 320. In one example, negative driveline torque is not expected when the driver moves their foot away from the brake pedal (or hovers over the accelerator pedal), and/or traffic clears up outside the vehicle resulting in a smaller closing rate or larger clearance between the given vehicle and the leading vehicle. Herein, it is inferred that the driver is likely to imminently increase torque demand.

At 320, in response to the expected positive driveline torque, the controller performs the second lash adjustment by moving through the lash region earlier before maintaining creep torque. Herein, when the driver intent does not include braking, the duration between the first lash adjustment and the second lash adjustment is smaller, and the powertrain torque is held at the slight negative deceleration torque level for a shorter amount of time. Further, the creep torque level is attained earlier. By transitioning through the lash zone earlier when negative driveline torque is not expected, driveline torque variations may be kept within threshold levels while improving vehicle response and reducing driver discomfort. In addition, when positive driveline torque is demanded, the demanded torque can be rapidly provided while the driveline is already at the creep torque level. As such, this improves drivability and reduces time to torque.

Returning to 314, if it is determined that vehicle slowdown using powertrain braking is not requested, at 316, it may be determined if the driver intends to slow the vehicle down via coasting. In one example, an intent to slow the vehicle down via coasting may be inferred if the driver moves their foot away from the brake pedal, hovers their foot over the accelerator pedal, or if the closing rate/clearance between the given vehicle and the vehicle in front increases (such as when traffic ahead of the given vehicle clears up). If the answer is YES, the routine proceeds to 322. Otherwise, the routine returns to 306 to monitor operator foot position and traffic movements outside the vehicle during the drive cycle. Next at 322, powertrain braking may be adjusted to maintain slight positive or creep torque. In particular, the controller may adjust one or more engine actuators to provide a powertrain braking level that decelerates vehicle and reduces the powertrain torque to a threshold torque level (creep torque) outside the lash region. Herein, the powertrain braking is applied before a brake pedal is actually applied and may include a less than threshold amount of powertrain braking applied to decelerate the vehicle at a slower rate to the creep torque level. The torque is then maintained at the threshold torque level and a torque transition through the lash region is not initiated. That is, the first lash adjustment during a positive to negative torque transition through the lash region is temporarily disabled. However, in other examples, the first lash adjustment is performed but at a later time.

A rate of powertrain braking to the threshold torque level may be adjusted based on a rate of pedal displacement during the operator foot-off accelerator pedal event. For example, if the pedal is displaced at a lower rate (e.g., a lower closing rate of the pedal), then a lower rate of powertrain braking (and/or lower amount of powertrain braking) may be applied. Further, the powertrain braking may be adjusted based on the learned driving pattern of the operator, as discussed earlier.

Applying the powertrain braking responsive to the foot-off accelerator pedal event when the vehicle is to be slowed via coasting includes switching off fuel to the engine cylinders, and shifting the transmission to neutral with the torque converter locked while the engine spins unfueled. In other words, the driveline is freewheeled by shifting the transmission into neutral, thereby decoupling the engine from the driveline downstream of the transmission clutches. In an alternate example, the driveline may be freewheeled via a one-way clutch in the transmission that prevents the engine's friction from retarding the vehicle's forwards motion when torque input to the one-way clutch by the engine is less than torque on the wheel side of the one-way clutch. Optionally, one or more engine loads may also be varied. The powertrain torque may then be held at the creep torque level before driveline torque is increased from a creep torque level responsive to a demand for positive torque, or decreased via a transition through the lash region responsive to a demand for negative torque. As elaborated below, a timing of each of the first and second lash adjustment during a subsequent transition through the lash region may be varied based on whether and how soon an increase in torque demand is expected, as based on the driver intent.

After adjusting the powertrain torque, method 300 proceeds to 324. At 324, the routine may determine if positive driveline torque is expected. For example, it is determined if there is an indication that the driver may reapply the accelerator pedal. The determination may be based on the monitored operator foot motion inside the foot-well region and/or based on traffic patterns ahead of the vehicle. In one example, positive torque is expected responsive to the driver moving their foot away from the brake pedal or towards the accelerator pedal (or hovering over the accelerator pedal), and/or traffic clearing up outside the vehicle resulting in a smaller closing rate or larger clearance between the given vehicle and a leading vehicle. Details of determining expected positive torque based on driver foot motion and traffic movements outside the vehicle are discussed at FIG. 4. If positive powertrain torque is expected, the routine proceeds to 326.

At 326, the controller maintains the driveline torque at the threshold torque level outside the lash region (at the creep torque) until the accelerator pedal is depressed at which time powertrain torque can be increased from the creep torque level to the driver demanded level. As a result, torque can be increased without the need for the driveline passing through the lash region. By maintaining a slight positive torque when positive driveline torque is imminently expected, drivability is improved, time to torque is reduced, and lash adjustments are obviated. As a result, lash associated issues such as NVH are reduced.

If positive driveline torque is not expected, the routine proceeds to 328 wherein the first lash adjustment is performed during a positive to negative torque transition through the lash region while providing powertrain braking to reduce the driveline torque to a deceleration torque level. Thereafter, the second lash adjustment is performed during a negative to positive torque transition through the lash region to a creep torque level. A duration between the first and second lash adjustment is extended and the second lash adjustment is performed later so as to hold the driveline torque at the deceleration torque level longer in anticipation of a demand for negative torque. If a brake pedal is applied while the driveline is at the deceleration torque level, the second lash adjustment can be avoided and negative torque can be applied from the deceleration torque level. In this way, by providing a slight negative torque when positive powertrain torque is not expected subsequently, the driveline is better prepared for converting kinetic energy to idle and FEAD power. Further, torque transitions within the lash zone may be reduced while improving vehicle response and reducing driver discomfort. Method 300 then exits.

It will be appreciated that in addition to the powertrain braking adjustments and the lash adjustments described above, the controller may also adjust an actuator (e.g., a first engine actuator) to take a first action responsive to the indication of driver intent to brake (such as the driver intent to slow the vehicle via light braking, or the anticipated driver demand for negative torque). In comparison, the controller may adjust the actuator (e.g., the same first engine actuator) or another actuator (e.g., a second, different engine actuator) to take a second, different action from the first action, responsive to the indication of driver intent to coast (such as the driver intent to slow the vehicle via coasting, or the anticipated driver demand for positive torque).

As an example, responsive to the driver intent to brake, an AC compressor may be actuated to increase an engine load, while responsive to the driver intent to coast, the AC compressor may be deactivated to reduce the engine load. In yet another example, an engine transmission may be engaged in gear and the torque converter may be locked. Consequently, powertrain braking may be increased by downshifting the transmission gear, and increasing the output power of an alternator (to thereby increase the alternator load on the engine). Further, powertrain braking may be increased by engaging a clutch of an AC compressor (to increase the AC compressor load on the engine) and increasing the displacement of the transmission clutch to provided higher levels of braking.

Figure 4:
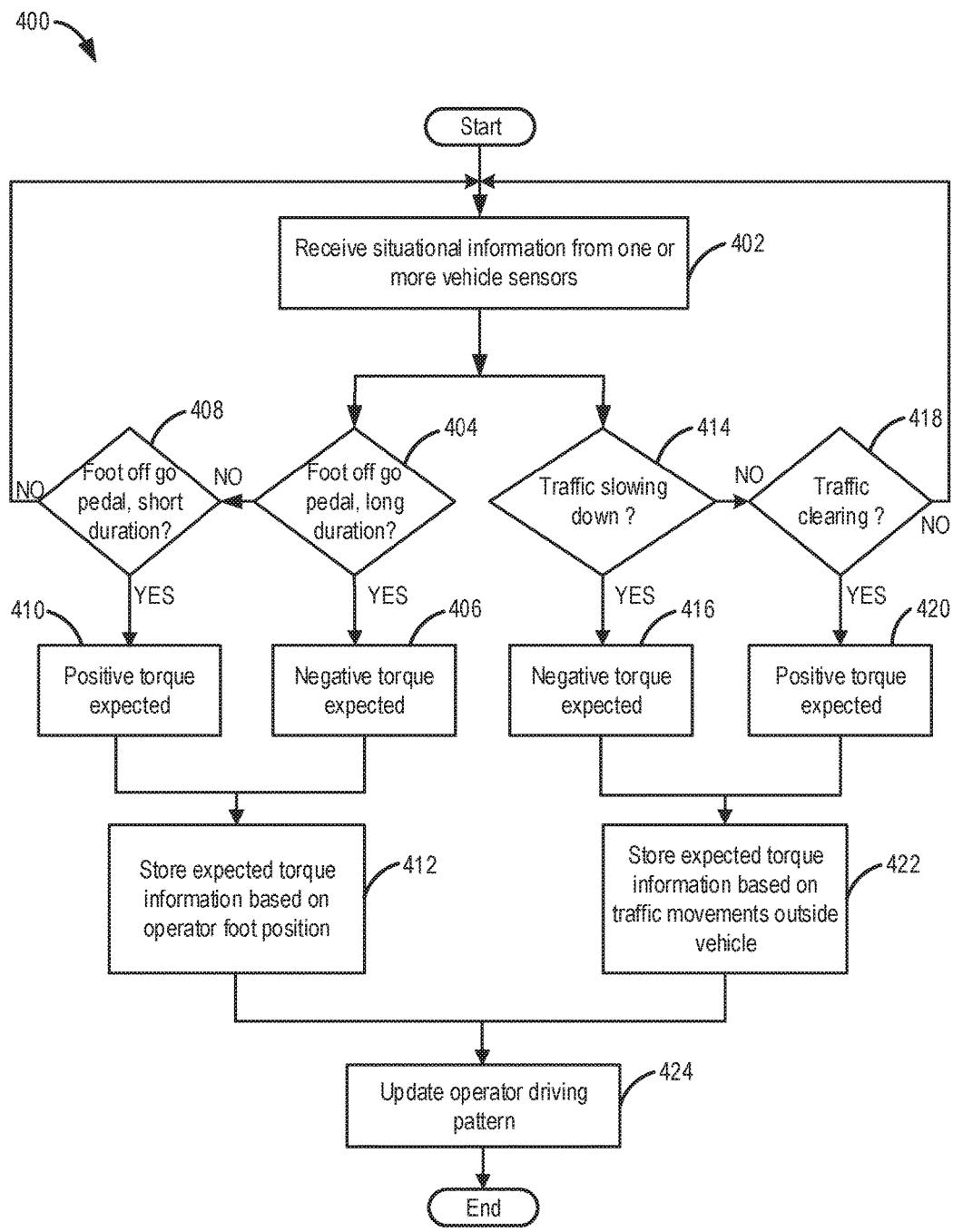
FIG. 4 depicts a flowchart for processing information from a foot camera inside a vehicle and traffic patterns outside the vehicle, to be used in conjunction with FIG. 3.

Referring to FIG. 4, an example method 400 is shown for determining driver intent based on input from various sensors such as operator foot motion inside a foot-well captured by a foot camera and traffic patterns including closing rate to a leading vehicle as determined by a range sensor. The method of FIG. 4 may be used in conjunction with the method of FIG. 3. For example, method 400 may be performed at steps 310, 317, and 324 of method 300. The method of FIG. 4 may be stored as executable instructions in non-transitory memory of controller 12 shown in FIGS. 1-2.

At 402, the method includes receiving situational information from one or more sensors, such as information on operator foot position from a foot-well region sensor or camera installed inside an operator foot-well region of the vehicle (such as foot camera 280 at FIG. 1) and information on traffic movements outside the vehicle from a range sensor (such as sensor 290 of FIG. 1). The foot camera monitors operator foot position with respect to each of an accelerator and a brake pedal, and relays foot position information to a controller. This includes monitoring a location and motion of the foot immediately after an accelerator pedal tip-out event or a brake pedal tip-out event.

The range sensor (which may be configured as a traffic camera) monitors traffic movements outside the vehicle and relays the traffic information to the controller. In one example, the sensor may monitor if traffic outside the vehicle is slowing down or clearing by sensing a gap or clearance between the given vehicle and a vehicle immediately ahead of it (that is, a closing rate to a leading vehicle). If the closing rate of the given vehicle is increasing, or the gap between the given vehicle and a leading vehicle immediately ahead of it is decreasing, it may be determined that traffic outside the current vehicle is slowing down, and driver intent to slow vehicle down via powertrain braking may be inferred. Alternatively, if the closing rate of the given vehicle is decreasing, or the gap between the given vehicle and the leading vehicle immediately ahead of it is increasing, it may be determined that the traffic outside the vehicle is clearing, and it may be inferred that the driver intends to slow the vehicle down via coasting. After receiving the situation information, the routine moves to both 404 and 414. In some examples, after receiving information on operator foot position with respect to accelerator and brake pedal, the routine proceeds to 404. Likewise, after receiving information on traffic motion, method 400 proceeds to 414.

At 404, the routine may determine if the operator foot is off the go pedal event for a long duration. In one example, the controller may determine if the vehicle operator's foot moves to towards the brake pedal, and if so, further determine for how long the driver's foot hovers over the brake pedal (following a foot-off go pedal event). If the driver's foot moves towards and hovers over the brake pedal for a long duration (such as longer than a threshold) after releasing the accelerator pedal, then it may be inferred that driver intends to brake. Accordingly at 406, the method includes inferring that negative powertrain torque is expected responsive to the driver's foot hovering over the brake pedal for a long duration.

Returning to 404, if the foot off go pedal event is not for a long duration, then at 408, the routine includes determining if the foot off go pedal is present for a short duration. In one example, if the driver's foot does not move towards the brake pedal and instead hovers over the accelerator pedal, or hovers over the brake pedal for a short duration (such as shorter than a threshold) after releasing the accelerator pedal, it may be inferred that the driver intends to slow the vehicle down via coasting. Accordingly at 410, the method includes inferring that positive powertrain torque is expected responsive to the driver's foot hovering over the brake pedal for a short duration.

If a foot-off go pedal event is not present, the routine returns to 402 to continue monitoring foot motion inside the foot well and traffic movements outside the vehicle.

From each of 406 and 410, after determining the expected driveline torque based on foot off pedal event and duration of the event, the routine proceeds to 412 to record and store information regarding the expected driveline torque in the controller's memory. In addition, at 424, based on operator foot motion at the foot-off go pedal event, an operator driving pattern is learned and/or updated. The method then exits.

Returning to 402, after determining traffic movements outside the vehicle, method 400 proceeds to 414. At 414, the routine may determine if traffic is slowing down outside the vehicle. In one example, traffic may be slowing down when the vehicle clearance is decreasing or closing rate is increasing. If the answer is YES, the routine proceeds to 416. At 416, the method may infer that negative driveline torque is expected responsive to traffic slowing down outside the vehicle. For example, it may be expected that the driver will imminently apply vehicle brakes to slow down the vehicle.

Returning to 414, if the traffic outside the vehicle is not slowing down, the routine proceeds to 418. At 418, the routine may determine if traffic outside the vehicle is clearing. In one example, traffic may be clearing when the vehicle clearance is increasing or closing rate is decreasing. If the answer is YES, method 400 proceeds to 420. At 420, the method may infer that positive driveline torque is expected responsive to traffic clearing outside the vehicle. For example, it may be inferred that the driver is coasting.

If the traffic outside the vehicle is not clearing or slowing down, the routine returns to 402 to continue monitoring foot motion inside the foot well and traffic movements outside the vehicle.

From each of 416 and 420, after determining the expected driveline torque based on vehicle clearance and closing rates, the routine proceeds to 422 to record and store information regarding the expected driveline torque in the controller's memory. In addition, at 424, based on operator foot motion at the foot-off go pedal event, an operator driving pattern is learned and/or updated. The method then exits. In one example, lash adjustments in a vehicle driveline may be varied based on input from a first camera scanning a foot-well region of the vehicle, and input from a second camera scanning a region in front of the vehicle. Specifically, inputs from the first and second camera may indicate and differentiate driver intent to brake or coast, enabling a timing of lash adjustments to be varied. In this way, lash adjustments may be adjusted based on driver intent in order to reduce driveline torque variations and reduce frequency of unnecessary torque transitions through a lash region.

Referring to FIG. 5, an example graphical output 500 is shown for adjusting lash in a vehicle driveline based on situational information, such as driver foot motion and traffic movements outside the vehicle.

The first graph represents change in vehicle speed over time at plot 501. The second graph represents accelerator pedal position (Accelerator_PP) versus time at plot 502. The vertical axis represents the accelerator pedal position and accelerator pedal is fully depressed in the direction of the vertical axis. The third graph represents brake pedal position (Brake_PP) versus time at plot 504. The vertical axis represents the brake pedal position and brake pedal is fully depressed in the direction of the vertical axis. The fourth graph represents powertrain torque versus time at plot 506. The vertical axis represents the powertrain torque and powertrain torque increases in the direction of the vertical axis. Powertrain torque values above zero torque (represented by a long dashed horizontal line) represent positive torque while powertrain torque values below zero torque represent negative torque (or brake torque). A lash zone 507, defined as region where torque reversals occur, is demarcated by a band of positive and negative torque around the zero torque value, depicted herein via small dashed horizontal lines. The fifth graph represents a torque converter clutch (TCC) operating state (locked or unlocked) versus time at plot 508. The sixth graph represents a clearance in the vehicle's path. The clearance is representative of a gap between the given vehicle and a leading vehicle ahead of it and may be inferred via a range sensor. It will be appreciated that while the clearance is depicted as a distance, in alternate examples it may be depicted as a time to impact. Vertical markers at times T0-T13 represent time of interest during the sequence. In all the plots discussed below, the horizontal axis represents time and time increases from the left side of each plot to the right side of each plot.

At T0, a vehicle is moving and the accelerator pedal (502) is maintained at a steady position (e.g., a middle level), with the transmission in a forward gear (such as a first gear) and torque converter (508) locked to ensure better fuel economy and to transmit positive powertrain torque (506). At T1, a driver releases the accelerator pedal until it is eventually fully released (that is, the driver takes their foot off the accelerator pedal). Herein, the accelerator pedal is released by the operator at a slower rate. The vehicle speed begins to decrease in response to the reduction in torque request following the foot-off accelerator pedal event. At this time, as estimated by the range sensor, a clearance between the given vehicle and a vehicle ahead of it is larger (such as due to traffic clearing out) such that at the accelerator pedal tip-out event, it may be anticipated that the driver intends to slow the vehicle down via coasting. Since brake application is not expected, at T1, a smaller rate of driveline braking is provided by deactivating the engine so that it does not combust fuel and air, and shifting the transmission to neutral while the TCC remains locked. While the vehicle driveline freewheels, a smaller rate of driveline braking is applied to reduce powertrain torque to a first (slightly positive) threshold torque 520 (creep torque) outside lash zone 507 in view of the slower rate of pedal displacement during the foot-off pedal event. In this way, engine torque may be reduced to a threshold torque outside a lash zone in response to a first operator foot-off accelerator pedal event. Subsequently, the powertrain torque may be maintained at the threshold torque until a subsequent operator foot-on accelerator pedal event. Herein, a lash adjustment is not performed in anticipation of positive torque demand. As the vehicle speed decreases, the clearance ahead of the vehicle may increase.

At T2, the accelerator pedal may be fully released and the vehicle speed may reduce further to a lower speed less than a threshold speed, and the torque converter clutch may remain locked for better fuel economy. The vehicle may remain in a neutral idle state with powertrain torque at the creep torque level 520 until a further increase in torque demand is received.

At T3, the driver applies the accelerator pedal to increase vehicle speed. Herein, the accelerator pedal is applied while the vehicle is coasting and before the vehicle speed has been reduced to a zero speed. In one example, the accelerator pedal is released when the vehicle is at 55 mph and the accelerator pedal is reapplied when the vehicle speed has been reduced to 50-52 mph. In response to the increased torque demand, the engine is reactivated (and combustion of air and fuel is resumed) and the transmission is shifted into a forward gear (e.g., a first gear). The engine is reactivated and the transmission is placed in gear to meet the non-zero torque demand requested by the foot-on accelerator pedal event. Further, the torque converter clutch may remain locked and the powertrain torque may increase. As the vehicle speed increases, the clearance ahead of the vehicle may decrease. By enabling the driveline torque to be held at the creep torque raised therefrom responsive to the increase in torque demand, a time to torque is reduced and unnecessary lash transitions are obviated.

At T4, the driver releases the accelerator pedal at a higher rate of displacement until it is eventually fully released (that is, the driver takes their foot off the accelerator pedal faster). The vehicle speed begins to decrease in response to the reduction in torque request following the foot-off accelerator pedal event. In this case, the vehicle speed may initially decrease at a rate that is proportional to the higher rate of displacement. In particular, the vehicle speed decreases following the foot-off accelerator pedal event at a faster rate than the decrease in vehicle speed following the foot-off accelerator pedal event at T1 where the rate of displacement was lower. However, the powertrain braking and rate of drop in vehicle speed at T4 is smaller than the powertrain braking and rate of drop in vehicle speed achieved when the brake pedal is applied (at T5). At this time, as estimated by the range sensor, a clearance between the given vehicle and a vehicle ahead of it is smaller (such as due to traffic slowing down) such that at the accelerator pedal tip-out event, it may be anticipated that the driver is likely to brake imminently. Responsive to the high rate of pedal displacement, a larger driveline braking is applied at T4. In particular, the engine is deactivated, the torque converter clutch may remain locked, and the transmission is held in gear so that engine braking torque can be used to counter wheel torque provided from the vehicle wheels to the driveline. The driveline braking is used to reduce powertrain torque to the zero torque level where it is held until the vehicle reaches a speed lower than a threshold speed. Then, with the torque converter clutch locked, further powertrain braking is used to reduce the powertrain torque from the zero torque to a second (slightly negative) threshold torque 530 (herein referred to as deceleration torque) outside the lash zone 507 in anticipation for more negative powertrain torque. A first lash adjustment is applied as the powertrain torque undergoes a positive to negative torque transition while moving through the lash zone.

To prepare the driveline for a subsequent increase in torque demand, the powertrain torque is required to be transitioned from second threshold torque 530 to first threshold torque 520 with a second lash adjustment applied as the powertrain torque undergoes a negative to positive torque transition while moving through the lash zone. However herein, in anticipation of driver intent to brake (due to the smaller clearance), the second lash adjustment and the transition through the lash zone is delayed. Thus, the powertrain is held at the deceleration torque level longer in anticipation of negative torque demand.

At T5, the driver may apply the brake pedal to request powertrain braking and the torque converter may be unlocked. At this time, the vehicle speed may decrease at a faster rate than previously achieved when powertrain braking is applied at foot-off accelerator pedal (T4). For example, the vehicle speed may initially decrease from 50 mph to 15 mph, and then decrease further to zero speed. The engine may continue running while the vehicle is stopped. Since the second lash adjustment has been delayed, the controller is able to rapidly provide the negative torque demand from the deceleration torque level. Thereafter, once the brake pedal is released at T6, the driveline is returned to the deceleration torque level and the deceleration torque may be maintained. Due to the braking, the vehicle clearance may increase and may be larger by T6. For example, traffic outside the vehicle may be clearing. The vehicle controller may therefor infer a driver intent to accelerate based on the larger clearance between vehicle and a leading vehicle. Therefore between T6 and T7, powertrain torque may be increased from the second threshold torque to the first threshold torque while performing lash adjustments when transitioning through the lash zone in anticipation that the driver may request more positive powertrain torque subsequently. After T7, the creep torque is held until positive torque is requested.

Herein, in anticipation of a driver intent to request positive torque (or to coast) in view of the larger clearance, the lash adjustment and lash zone transition is performed earlier. The earlier transition to the creep torque enables the positive torque to be rapidly provided when it is eventually demanded, improving drivability. It will be appreciated that if the clearance was smaller and a driver intent to request negative torque (or further braking) was anticipated, the lash adjustment and lash zone transition may have been performed later (as indicated by dashed segment 505). The later transition to the creep torque enables the negative torque to be rapidly provided when it is eventually demanded, improving drivability. At T8, the driver may apply the accelerator pedal and the torque converter clutch may remain unlocked to launch vehicle from zero speed to a higher speed. For example, the vehicle may be launched from zero speed to 15 mph. Between T8 and T9, as the accelerator pedal is depressed, the torque converter clutch is locked, transmission is engaged in gear and powertrain torque may increase. The vehicle speed correspondingly increases.

At T10, the accelerator pedal is released and the torque converter may be unlocked, however due to the larger clearance, vehicle coasting is expected and braking is not expected. Therefore at T10, a smaller rate of driveline braking is provided to reduce powertrain torque to the first threshold torque 520 outside lash zone 507 and maintain it there. Subsequently, the vehicle speed may decrease gradually. For example, the vehicle speed may decrease from 15 mph to 10 mph. However, at T11, the operator unexpectedly applies the brake pedal. Responsive to the brake pedal application, the powertrain torque is transitioned through the lash zone and then negative torque is applied. Consequently, the vehicle speed may decrease further. In one example, the vehicle speed may decrease from 10 mph to zero speed. The engine may continue running while the vehicle is stopped. At T12, once the brake pedal is released, the powertrain negative torque is returned to second threshold torque 530. At T13, the powertrain torque is once again transitioned through the lash zone and held at first threshold torque 520 in anticipation of positive torque due to the larger clearance. At T14, the accelerator pedal is applied and positive torque is provided. The torque converter may remain unlocked to launch vehicle from zero speed to a higher speed such as 10 mph, for example. After T14, the vehicle speed may increase further and the torque converter may be locked to transmit positive torque and provide better fuel economy.

In this way, responsive to a first operator foot-off accelerator pedal event, an engine controller may reduce engine torque to a threshold torque outside a lash region, and maintain the engine torque at the threshold torque until a subsequent operator foot-on accelerator pedal event. In comparison, in response to a second operator foot-off accelerator pedal event, the controller may reduce engine torque to the threshold torque outside a lash region, then transition through the lash region via a first lash adjustment followed by transitioning through the lash region via a second lash adjustment, a duration between the first and the second lash adjustment adjusted based on inferred driver intent to brake differentiated from driver intent to coast. Herein, during each of the first and second events, a rate of reducing the engine torque to the threshold torque outside the lash region is based on a rate of pedal displacement, the rate of reducing increased as the rate of pedal displacement increases. Reducing engine torque includes reducing engine torque via powertrain braking. Responsive to the second operator foot-off accelerator pedal event, the duration between the first and the second lash adjustment may be decreased when the inferred driver intent is to coast, and the duration may be increased when the inferred driver intent is to brake. Herein, the inferred driver intent is based on each of operator foot motion and vehicle clearance following the second operator foot-off accelerator pedal event, the operator foot motion inferred via a sensor coupled to a vehicle operator foot-well region, the vehicle clearance inferred via a vehicle gap sensor. The inferred driver intent may be further based on a learned operator driving pattern, the learned driving pattern including one or more of an accelerator pedal patterns, a brake pedal pattern, a preference for vehicle performance, and a preference for engine fuel economy. Further, in response to a brake pedal event following the first operator foot-off accelerator pedal event, the engine controller may transition the driveline torque through the lash region from the threshold torque via the first lash adjustment followed by transitioning through the lash region via the second lash adjustment, the duration between the first and the second lash adjustment adjusted based on a braking demand during the brake pedal event. Herein, the first lash adjustment is performed during a positive-to-negative torque reversal through the lash region, while the second lash adjustment is performed during a negative-to-positive torque reversal through the lash region.

In this way, unnecessary torque transitions through a lash region are reduced. By maintaining at least a creep torque responsive to an inferred driver intent to coast following a foot-off accelerator pedal event, a subsequent positive torque demand can be rapidly met, improving time to torque. Likewise, by adjusting a time when a torque transition through the lash region is initiated based on the driver intent, drivability is improved. Specifically, by initiating a transition through the lash region to the creep torque earlier responsive to the inferred driver intent to coast following a foot-off accelerator pedal event, the positive torque demand can be met rapidly. In comparison, by initiating the transition through the lash region to the creep torque later responsive to a inferred driver intent to brake following a foot-off accelerator pedal event, a negative torque demand can be met rapidly, such as from a deceleration torque level. By adjusting a transition through the lash zone, fuel losses and NVH issues associated with lash adjustments are reduced. Overall, vehicle performance and component life is improved.

In one example, a method for an engine in a vehicle comprises: in response to an operator foot-off accelerator pedal event, distinguishing between a driver intent to brake or coast based on one or more of operator foot motion inside the vehicle and traffic pattern outside the vehicle; and varying lash adjustments during torque transition through a lash region following the operator foot-off accelerator pedal event based on the driver intent. In the preceding example, additionally or optionally, the lash adjustments include a first lash adjustment during a positive-to-negative torque transition through the lash region and varying a second lash adjustment during a negative-to-positive torque transition through the lash region. In any or all of the preceding examples, additionally or optionally, the varying includes, when the driver intent includes coasting, reducing engine torque to a threshold torque level outside the lash region, and disabling each of the first and second lash adjustment, where the lash region is based on torque converter input and output speeds of a fully unlocked torque converter. In any or all of the preceding examples, additionally or optionally, the varying includes, initiating the first lash adjustment at a timing based on a rate pedal displacement during the operator foot-off accelerator pedal event, and then initiating the second lash adjustment earlier during the torque transition when the driver intent includes coasting, and initiating the second lash adjustment later during the torque transition when the driver intent includes braking. In any or all of the preceding examples, additionally or optionally, the varying is further based on an operator driving pattern, the operator driving pattern including a preference for performance relative to a preference for fuel economy.

Further, in any or all of the preceding examples, additionally or optionally, the varying includes initiating each of the first lash adjustment and the second lash adjustment earlier when the operator driving pattern includes a preference for performance over fuel economy, and initiating each of the first lash adjustment and the second lash adjustment later when the operator driving pattern includes a preference for fuel economy over performance. In any or all of the preceding examples, additionally or optionally, the distinguishing includes indicating driver intent to brake responsive to operator foot motion towards a brake pedal and indicating driver intent to coast responsive to operator foot motion near an accelerator pedal. In any or all of the preceding examples, additionally or optionally, the distinguishing includes indicating driver intent to brake responsive to traffic pattern indicative of smaller clearance ahead of vehicle, and indicating driver intent to coast responsive to traffic pattern indicative of larger clearance ahead of vehicle. In any or all of the preceding examples, additionally or optionally, the operator foot motion inside the vehicle is based on input from a camera scanning a foot-well region of the vehicle, and wherein the traffic pattern outside the vehicle is based on input from a camera scanning a region in front of the vehicle.

In another example, a method for an engine coupled to a vehicle may comprise: in response to a first operator foot-off accelerator pedal event, reducing engine torque to a threshold torque outside a lash region, and maintaining the engine torque at the threshold torque until a subsequent operator foot-on accelerator pedal event; and in response to a second operator foot-off accelerator pedal event, reducing engine torque to the threshold torque outside a lash region, then transitioning through the lash region via a first lash adjustment followed by transitioning through the lash region via a second lash adjustment, a duration between the first and the second lash adjustment adjusted based on inferred driver intent to brake differentiated from driver intent to coast. In the preceding example, additionally or optionally comprise, during each of the first and second events, a rate of reducing the engine torque to the threshold torque outside the lash region is based on a rate of pedal displacement, the rate of reducing increased as the rate of pedal displacement increases. In any or all of the preceding examples, additionally or optionally, reducing engine torque includes reducing engine torque via powertrain braking. In any or all of the preceding examples, additionally or optionally, responsive to the second operator foot-off accelerator pedal event, the duration between the first and the second lash adjustment is decreased when the inferred driver intent is to coast, and the duration is increased when the inferred driver intent is to brake.

Further yet, in any or all of the preceding examples, additionally or optionally, the inferred driver intent is based on each of operator foot motion and vehicle clearance following the second operator foot-off accelerator pedal event, the operator foot motion inferred via a sensor coupled to a vehicle operator foot-well region, the vehicle clearance inferred via a vehicle gap sensor. In any or all of the preceding examples, additionally or optionally, the inferred driver intent is further based on a learned operator driving pattern, the learned driving pattern including one or more of an accelerator pedal patterns, a brake pedal pattern, a preference for vehicle performance, and a preference for engine fuel economy. Any or all of the preceding examples, may additionally or optionally, further comprise, in response to a brake pedal event following the first operator foot-off accelerator pedal event, transitioning through the lash region from the threshold torque via the first lash adjustment followed by transitioning through the lash region via the second lash adjustment, the duration between the first and the second lash adjustment adjusted based on a braking demand during the brake pedal event. In any or all of the preceding examples, additionally or optionally, the first lash adjustment is performed during a positive-to-negative torque reversal through the lash region, and wherein the second lash adjustment is performed during a negative-to-positive torque reversal through the lash region.

Another example vehicle system comprises: an operator foot-well region including an accelerator pedal, a brake pedal, and a foot-well sensor; a sensor coupled to the vehicle system for estimating a gap between the vehicle system and a leading vehicle; an engine including a fuel injector and an intake throttle valve; and a controller with computer-readable instructions stored on non-transitory memory for: in response to a foot-off accelerator pedal event, applying a first powertrain brake torque to reduce engine torque to a threshold torque above a lash region via adjustments to a duty cycle of the fuel injector and an opening of the intake throttle valve; inferring a driver intent to coast or brake based on one or more of the traffic sensor and the foot-well sensor; and selectively performing a lash adjustment through the lash region based on the inferred driver intent. In any or all of the preceding examples, additionally or optionally, the selectively performing the lash adjustment includes: performing the lash adjustment when the inferred driver intent includes braking; and not performing the lash adjustment when the inferred driver intent includes coasting. In any or all of the preceding examples, additionally or optionally, the selectively performing the lash adjustment further includes: initiating the lash adjustment through the lash region earlier when the inferred driver intent includes coasting; and initiating the lash adjustment through the lash region later when the inferred driver intent includes braking.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine of a vehicle, comprising:
in response to an operator foot-off accelerator pedal event,
distinguishing between a driver intent to brake or coast based on one or more of operator foot motion inside the vehicle and a traffic pattern outside the vehicle; and
varying lash adjustments during torque transition through a lash region following the operator foot-off accelerator pedal event based on the driver intent, the lash adjustments including a first lash adjustment during a positive-to-negative torque transition through the lash region and a second lash adjustment during a negative-to-positive torque transition through the lash region, wherein the varying includes, when the driver intent includes coasting, reducing engine torque to a threshold torque level outside the lash region, and disabling each of the first and second lash adjustments, the lash region based on torque converter input and output speeds of a fully unlocked torque converter.

2. The method of claim 1, wherein the varying includes, initiating the first lash adjustment at a timing based on a rate pedal displacement during the operator foot-off accelerator pedal event, and then initiating the second lash adjustment earlier during the torque transition when the driver intent includes coasting, and initiating the second lash adjustment later during the torque transition when the driver intent includes braking.

3. The method of claim 2, wherein the varying is further based on an operator driving pattern, the operator driving pattern including a preference for performance relative to a preference for fuel economy.

4. The method of claim 3, wherein the varying includes initiating each of the first lash adjustment and the second lash adjustment earlier when the operator driving pattern includes a preference for performance over fuel economy, and initiating each of the first lash adjustment and the second lash adjustment later when the operator driving pattern includes a preference for fuel economy over performance.

5. The method of claim 1, wherein the distinguishing includes indicating driver intent to brake responsive to the operator foot motion towards a brake pedal and indicating driver intent to coast responsive to the operator foot motion near an accelerator pedal, and adjusting an actuator to take a first action responsive to the indication of driver intent to brake, and adjusting the actuator or another actuator to take a second, different action from the first action, responsive to the indication of driver intent to coast.

6. The method of claim 1, wherein the distinguishing includes indicating driver intent to brake responsive to a traffic pattern indicative of smaller clearance ahead of the vehicle, and indicating driver intent to coast responsive to a traffic pattern indicative of larger clearance ahead of the vehicle.

7. The method of claim 1, wherein the operator foot motion inside the vehicle is based on input from a camera scanning a foot-well region of the vehicle, and wherein the traffic pattern outside the vehicle is based on input from a camera scanning a region in front of the vehicle.

8. A method for an engine coupled to a vehicle, comprising:
in response to a first operator foot-off accelerator pedal event, reducing engine torque to a threshold torque outside a lash region, and maintaining the engine torque at the threshold torque until a subsequent operator foot-on accelerator pedal event; and
in response to a second operator foot-off accelerator pedal event, reducing engine torque to the threshold torque outside the lash region, then transitioning through the lash region via a first lash adjustment followed by transitioning through the lash region via a second lash adjustment, a duration between the first and the second lash adjustments adjusted based on inferred driver intent to brake differentiated from driver intent to coast.

9. The method of claim 8, wherein during each of the first and second events, a rate of reducing the engine torque to the threshold torque outside the lash region is based on a rate of pedal displacement, the rate of reducing increased as the rate of pedal displacement increases.

10. The method of claim 8, wherein reducing engine torque includes reducing engine torque via powertrain braking.

11. The method of claim 8, wherein responsive to the second operator foot-off accelerator pedal event, the duration between the first and the second lash adjustments is decreased when the inferred driver intent is to coast, and the duration is increased when the inferred driver intent is to brake.

12. The method of claim 8, wherein the inferred driver intent is based on each of operator foot motion and vehicle clearance following the second operator foot-off accelerator pedal event, the operator foot motion inferred via a sensor coupled to a vehicle operator foot-well region, the vehicle clearance inferred via a vehicle gap sensor.

13. The method of claim 12, wherein the inferred driver intent is further based on a learned operator driving pattern, the learned operator driving pattern including one or more of an accelerator pedal pattern, a brake pedal pattern, a preference for vehicle performance, and a preference for engine fuel economy.

14. The method of claim 8, further comprising, in response to a brake pedal event following the first operator foot-off accelerator pedal event, transitioning through the lash region from the threshold torque via the first lash adjustment followed by transitioning through the lash region via the second lash adjustment, the duration between the first and the second lash adjustments adjusted based on a braking demand during the brake pedal event.

15. The method of claim 8, wherein the first lash adjustment is performed during a positive-to-negative torque reversal through the lash region, and wherein the second lash adjustment is performed during a negative-to-positive torque reversal through the lash region.

16. A vehicle system, comprising:
an operator foot-well region including an accelerator pedal, a brake pedal, and a foot-well sensor;
a sensor coupled to the vehicle system for estimating a gap between the vehicle system and a leading vehicle;
an engine including a fuel injector and an intake throttle valve; and
a controller with computer-readable instructions stored on non-transitory memory for:
in response to a foot-off accelerator pedal event,
apply a first powertrain brake torque to reduce engine torque to a threshold torque above a lash region via adjustments to a duty cycle of the fuel injector and an opening of the intake throttle valve;
infer a driver intent to coast or brake based on one or more of a traffic sensor and the foot-well sensor; and
selectively perform a lash adjustment through the lash region based on the inferred driver intent.

17. The vehicle system of claim 16, wherein the selectively perform the lash adjustment includes:
perform the lash adjustment when the inferred driver intent includes braking; and
not perform the lash adjustment when the inferred driver intent includes coasting.

18. The vehicle system of claim 16, wherein the selectively perform the lash adjustment further includes:
initiate the lash adjustment through the lash region earlier when the inferred driver intent includes coasting; and
initiate the lash adjustment through the lash region later when the inferred driver intent includes braking.

* * * * *